(12) United States Patent
Lehmann et al.

(10) Patent No.: US 9,313,398 B2
(45) Date of Patent: Apr. 12, 2016

(54) WARNING SYSTEM FOR SUB-OPTIMAL SENSOR SETTINGS

(71) Applicant: International Business Machines Corporation, Armonk, NY (US)

(72) Inventors: Stefan Lehmann, Tucson, AZ (US); Christopher Wade Ruhl, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 14/220,422

(22) Filed: Mar. 20, 2014

(65) Prior Publication Data

US 2015/0271391 A1 Sep. 24, 2015

(51) Int. Cl.
*G08B 21/00* (2006.01)
*H04N 5/232* (2006.01)

(52) U.S. Cl.
CPC ....... *H04N 5/23222* (2013.01); *H04N 5/23216* (2013.01); *H04N 5/23245* (2013.01)

(58) Field of Classification Search
CPC ............ B60S 1/482; B60S 1/488; B60S 1/50; B60S 1/483; B60S 1/487; B60S 1/522; B60S 1/245; B60S 1/52; B60S 1/524; B60S 2001/3836; B25J 11/00; B60L 11/1827; B60L 11/1846; B60L 11/1816; B60L 11/182
USPC ............ 340/540, 500, 539.1, 539.21, 539.25, 340/539.26, 539.22, 545.3, 555, 568.4, 340/825.24
See application file for complete search history.

(56) References Cited

U.S. PATENT DOCUMENTS

| | | | |
|---|---|---|---|
| 7,317,485 B1 | 1/2008 | Miyake et al. | |
| 7,668,454 B2 * | 2/2010 | Battles et al. | 396/281 |
| 8,385,039 B2 * | 2/2013 | Rothkopf | 361/173 |
| 2004/0249650 A1 * | 12/2004 | Freedman et al. | 705/1 |
| 2007/0092976 A1 * | 4/2007 | Watson et al. | 436/181 |
| 2009/0146807 A1 * | 6/2009 | Chang | 340/540 |
| 2012/0233841 A1 * | 9/2012 | Stein | 29/428 |
| 2012/0236173 A1 * | 9/2012 | Telek et al. | 348/223.1 |

* cited by examiner

*Primary Examiner* — Daniel Previl

(74) *Attorney, Agent, or Firm* — Derek S. Jennings; Patent Mining Works, LLC

(57) ABSTRACT

A method includes a computing device receiving at least one sensor reading from at least one sensor on a user's device; the computing device determining at least one setting on the user's device based upon the received at least one sensor reading; the computing device detecting a change from the at least one sensor that could affect an optimal setting for the determined at least one setting; and notifying a user that the detected change has occurred.

20 Claims, 4 Drawing Sheets

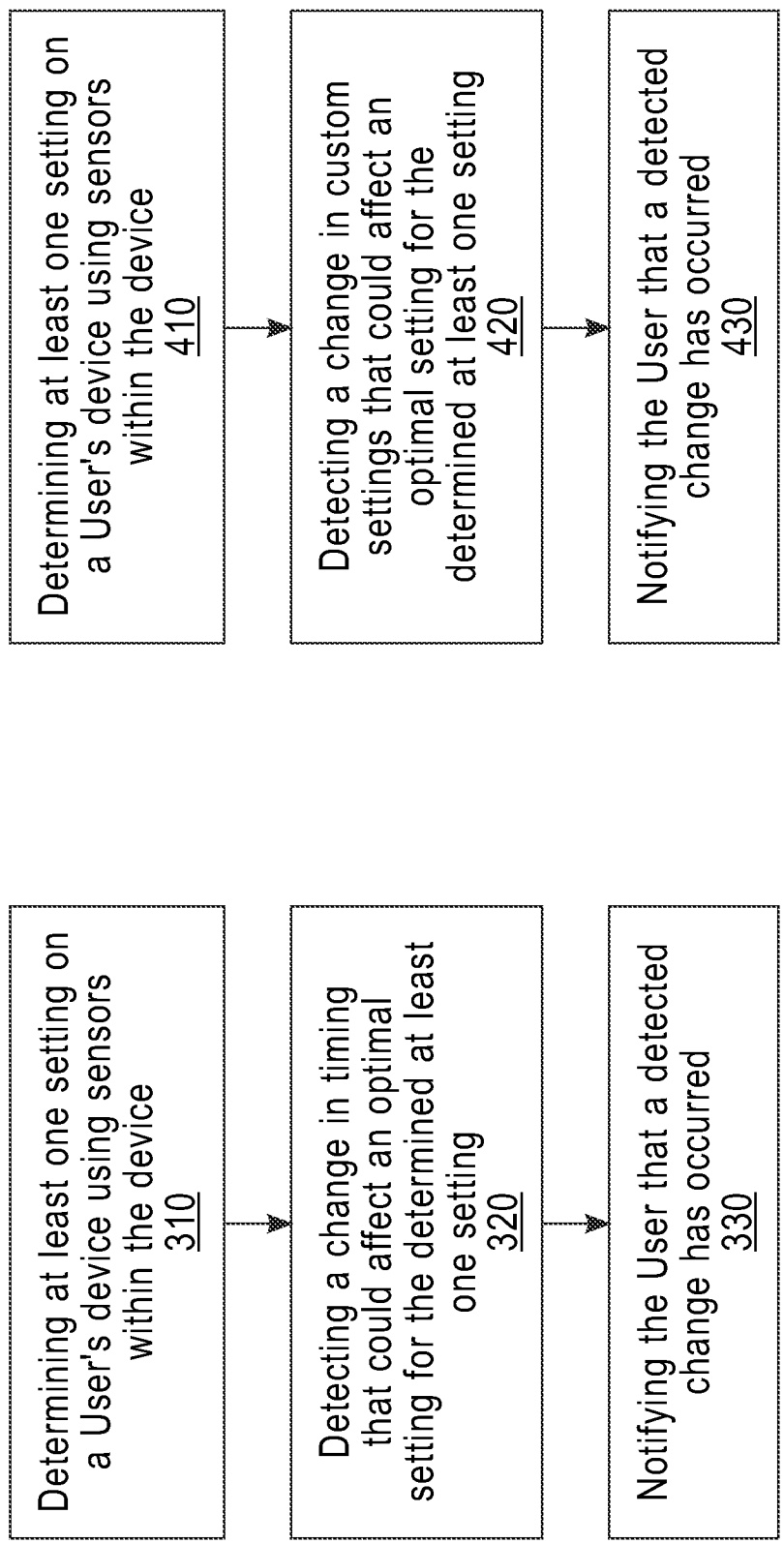

WARNING SYSTEM FOR SUB-OPTIMAL SENSOR SETTINGS

BACKGROUND

The present invention relates to using sensor data, and more specifically, to issue warning alerts for sub-optimal settings on user devices.

SUMMARY

According to one aspect of the present invention, a method includes a computing device receiving at least one sensor reading from at least one sensor on a user's device; the computing device determining at least one setting on the user's device based upon the received at least one sensor reading; the computing device detecting a change from the at least one sensor that could affect an optimal setting for the determined at least one setting; and notifying a user that the detected change has occurred.

According to another aspect of the present invention, a system including: one or more processors, one or more computer-readable memories and one or more computer-readable, tangible storage devices; a receiving module operatively coupled to at least one of the one or more storage devices for execution by at least one of the one or more processors via at least one of the one or more memories, configured to receive at least one sensor reading from at least one sensor on a user's device; a determining module operatively coupled to at least one of the one or more storage devices for execution by at least one of the one or more processors via at least one of the one or more memories, configured to determine at least one setting on the user's device based upon the received at least one sensor reading; a detecting module operatively coupled to at least one of the one or more storage devices for execution by at least one of the one or more processors via at least one of the one or more memories, configured to detect a change from the at least one sensor that could affect an optimal setting for the determined at least one setting; and a notifying module operatively coupled to at least one of the one or more storage devices for execution by at least one of the one or more processors via at least one of the one or more memories, configured to notify a user that the detected change has occurred.

According to yet another aspect of the present invention, a computer program product including one or more computer-readable, tangible storage medium; program instructions, stored on at least one of the one or more storage medium, to receive at least one sensor reading from at least one sensor on a user's device; program instructions, stored on at least one of the one or more storage medium, to determine at least one setting on the user's device based upon the received at least one sensor reading; program instructions, stored on at least one of the one or more storage medium, to detect a change from the at least one sensor that could affect an optimal setting for the determined at least one setting; and program instructions, stored on at least one of the one or more storage medium, to notify a user that the detected change has occurred.

BRIEF DESCRIPTION OF THE SEVERAL VIEWS OF THE DRAWINGS

FIG. 3 shows a flowchart according to still another embodiment of the present invention.

FIG. 4 shows a flowchart according to yet another embodiment of the present invention.

DETAILED DESCRIPTION

Figure 2:
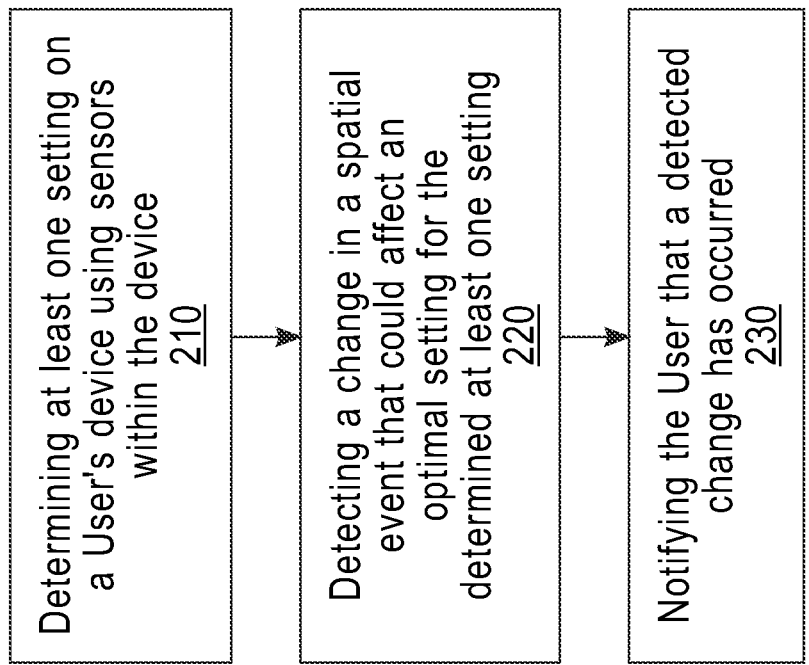
FIG. 2 shows a flowchart according to another embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

Figure 1:
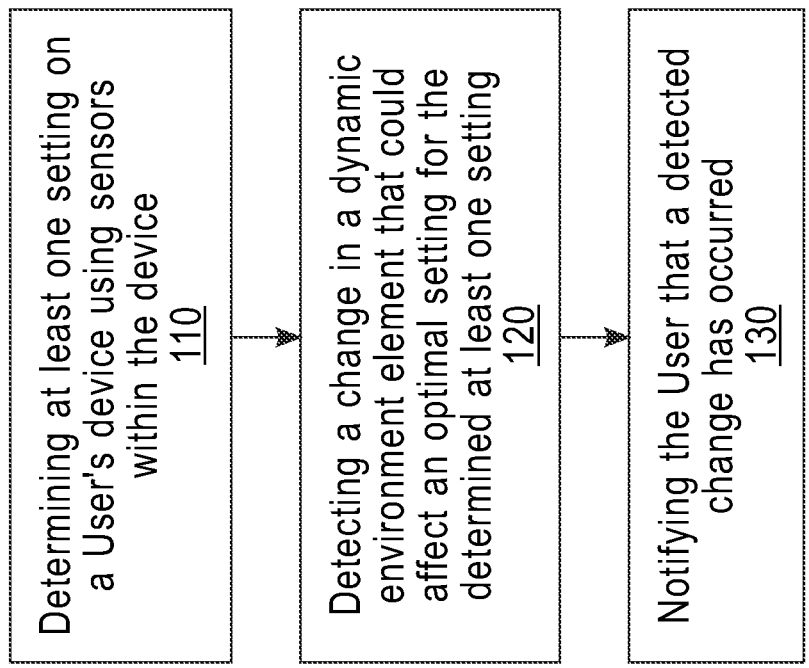
FIG. 1 shows a flowchart according to an embodiment of the present invention.

Now referring to FIG. 1, an embodiment of the present invention uses technology found in cameras (or from other sensing devices) having one or more user-configurable options. For instance, one digital camera model may allow the photographer to change the ISO sensitivity, exposure time, use manual or auto focus methods or a multitude of other configurable options. In some cases a photographer (or other technician) may be focused on a certain scene or task with the camera with a fixed set of options. A short time later the photographer may change scenes or viewpoints but fails to change the necessary camera settings. While the settings may be usable in the new situation, they may not be optimal. If photos are taken of the new scene using the old settings the photographs may be suboptimal.

Other examples include handheld devices such as smartphones or tablet PCs with build in camera function or programmable handheld devices that simply require manual settings prior to use, eg. devices that allow to measure radiation, gas, temperature or provide any other type of sensor input. In the particular case of photographic sensors, some cameras will attempt to determine the type of scene and make corrections on the fly. However, the photographer who uses manual or semi-manual settings in a changing environment must rely on memory and skill to ensure correct settings. An embodiment of the present invention uses a process to check for dynamic environment element changes.

Still referring to FIG. 1, a process determines at least one setting on a user's device, eg. a camera and/or video, sensor(s) (110). The process continues by detecting a change in a dynamic environment element that could affect an optimal setting for the determined setting (120). If a change has been detected, the user is notified that a change has occurred (130). The notification may produce audible warnings, flash warning lights or some other else to warn the user that current settings may no longer be optimal. Examples of environmental elements may include light, distance, power for flash or shuttle control, buffer size or some other protocols. Using the camera as example, the dynamic range of a photographic sensor refers to the sensors ability to distinguish detail in (relatively) very bright and very dark areas of a scene. A common technique for extending a camera's dynamic range is to take 2 or more photos of the same (stationary) scene at different exposures. This technique is known as "Bracketing". During a photo shoot a photographer requires a bracketed sequence for a High Dynamic Range shot. In this case, the settings must be changed to aperture priority to take advantage of the lens depth of field capability. However, in some cases the camera must be set for manual focus. In this case the photographer should be alerted if the angle/distance of the camera changes or if there is a significant change in the scene (light, contrast, etc.).

Referring to FIG. 2, another embodiment of the present invention uses another process for determining at least one setting on a user's device, eg. a camera, sensor(s) (210). The process continues by detecting a change in a spatial event that could affect an optimal setting for the determined setting (220). If a change has been detected, the user is notified that a change has occurred (230). The notification may produce audible warnings, flash warning lights or some other else to warn the user that current settings may no longer be optimal. Examples of spatial events may include GPS positioning or local orientation. An example may include a device which might be set to operate based on its sensor input and certain customer settings, which was performed at sea level, yet other measurement at higher altitude might render some of the settings obsolete.

Referring to FIG. 3, yet another embodiment of the present invention uses yet another process for determining at least one setting on a user's device, eg. a camera and/or video, sensor(s) (310). The process continues by detecting a change in timing that could affect an optimal setting for the determined setting (320). If a change has been detected, the user is notified that a change has occurred (330). The notification may produce audible warnings, flash warning lights or some other else to warn the user that current settings may no longer be optimal. An example of a timing event may include shooting sunrise or sunset images. As one familiar shooting such images timing of the shot is important. Usually there is only a small window to capture the image before the current setting becomes less than optimal.

Referring to FIG. 4, still another embodiment of the present invention uses still another process for determining at least one setting on a user's device, eg. a camera and/or video, sensor(s) (410). The process continues by detecting a change in custom settings that could affect an optimal setting for the determined setting (420). If a change has been detected, the user is notified that a change has occurred (430). The notification may produce audible warnings, flash warning lights or some other else to warn the user that current settings may no longer be optimal. Examples of a custom setting changes include a setting change in both the aperture and shutter settings.

Figure 5:
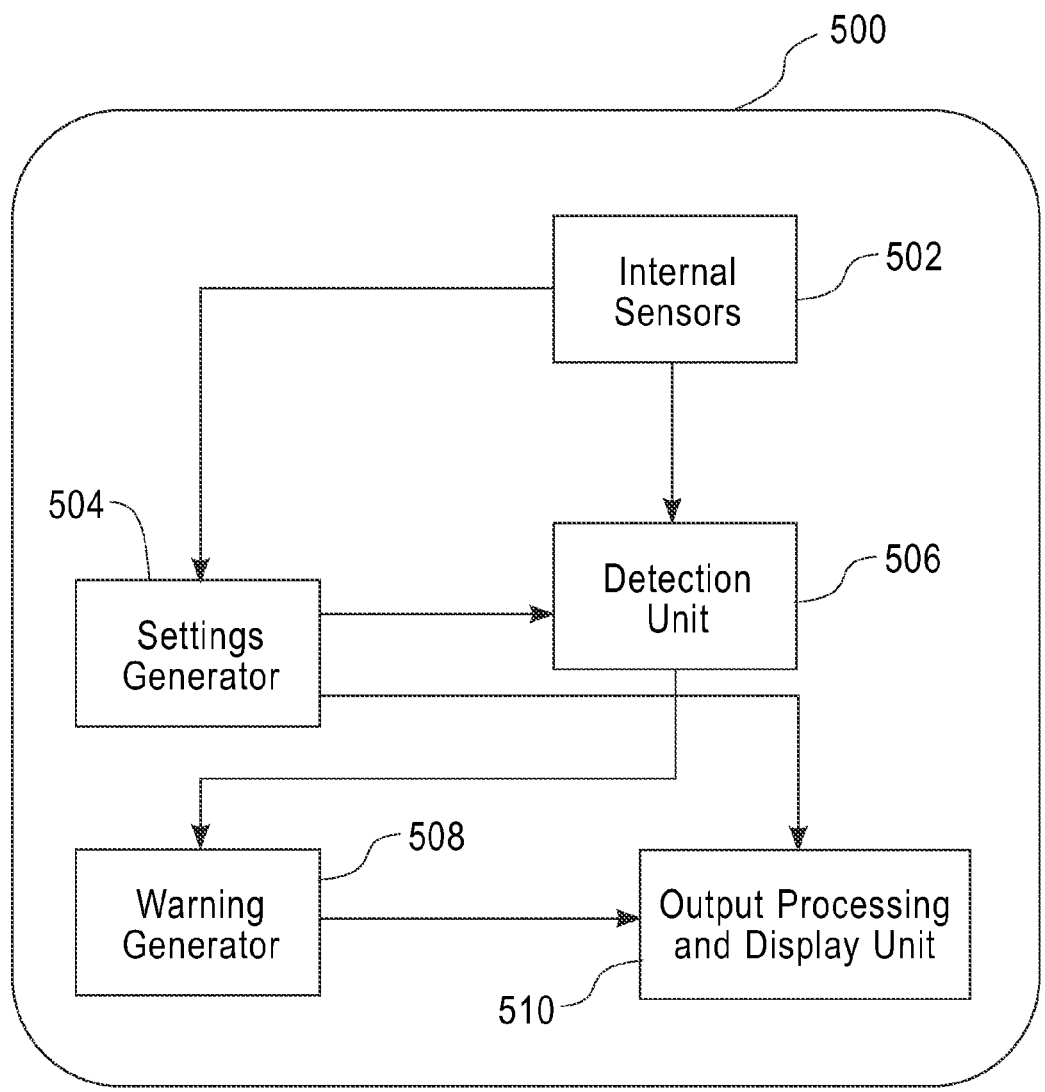
FIG. 5 shows exemplary implementation according to an embodiment of the present invention.

Referring to FIG. 5 an exemplary implementation according to an embodiment of the present invention is depicted. A user's device 500 includes a plurality of sensors 502. The user's device 500 may be a camera, video camera, a smart phone, personal computer or a computer tablet. The internal sensors 502 can include light metering elements, a GPS device, a timing device, and a distance measuring device. One output of the internal sensors 502 element is received by a settings generator 504. The settings generator 504 determines the settings for the user's device 500. An output processing and display unit 510 receives the settings as determined by the settings generator 504. The output processing unit and display 510 then displays the image before the picture is taken. While the output processing and display unit 510 is ready to capture the image, a detection unit 506 also receives current sensor reading signals from the internal sensors 502. If the detection unit 506 detects a change in sensors readings based upon a previous output of settings generator 504 a signal is set to a warning generator 508. The warning generator 508 produces audible and flash warning lights to warn the user that current settings may no longer be optimal. The warning generator 504 also sends a signal to the output processing and display unit 510 to inhibit the capturing of the image unless the user overrides the warning generator 508.

Figure 6:
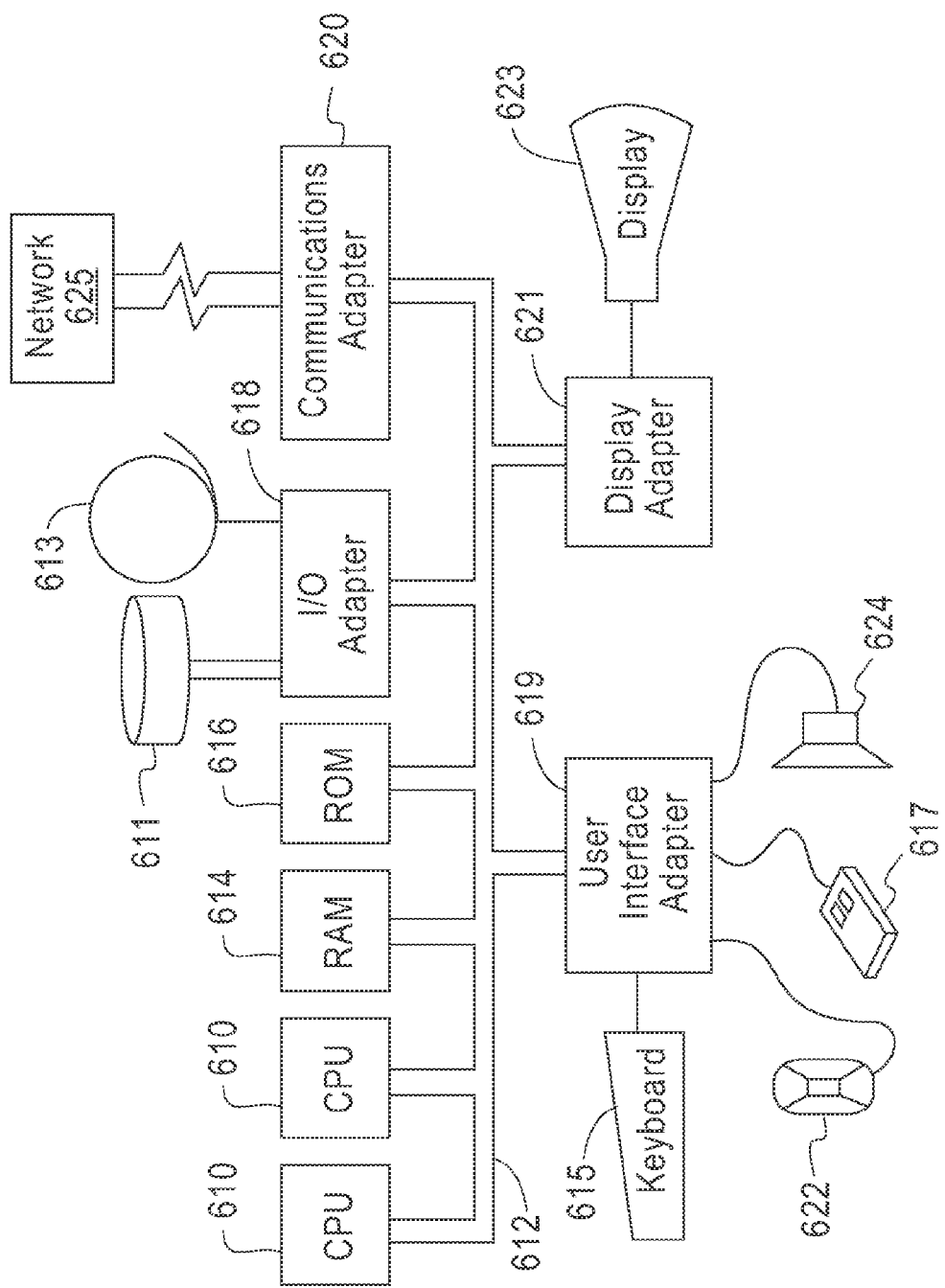
FIG. 6 illustrates a hardware configuration according to an embodiment of the present invention.

Referring now to FIG. 6, this schematic drawing illustrates a hardware configuration of an information handling/computer imaging system in accordance with the embodiments of the invention. The system comprises at least one processor or central processing unit (CPU) 610. The CPUs 610 are interconnected via system bus 612 to various devices such as a random access memory (RAM) 614, read-only memory (ROM) 616, and an input/output (I/O) adapter 618. The I/O adapter 618 can connect to peripheral devices, such as disk units 611 and tape drives 613, or other program storage devices that are readable by the system. The system can read the inventive instructions on the program storage devices and follow these instructions to execute the methodology of the embodiments of the invention. The system further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 connects the bus 612 to a data processing network 625, and a display adapter 621 connects the bus 612 to a display device 623 which may be embodied as an output device such as a monitor, printer, or transmitter, for example.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    a computing device receiving at least one sensor reading from at least one sensor on a user's device;
    the computing device determining at least one setting on the user's device based upon the received at least one sensor reading;
    the computing device detecting a change from the at least one sensor that could affect an optimal setting for the determined at least one setting; and
    notifying a user that the detected change has occurred.

2. The method according to claim 1, wherein the detected change is a change in a dynamic environment element.

3. The method according to claim 1, wherein the detected change is a change in a spatial event.

4. The method according to claim 1, wherein the detected change is a change in timing.

5. The method according to claim 1, wherein the detected change is a change in custom settings.

6. The method according to claim 1, wherein the user's device is a camera.

7. The method according to claim 6, wherein the notification includes an audible warning.

8. A system comprising:
    one or more processors, one or more computer-readable memories and one or more computer-readable, tangible storage devices;
    a receiving module operatively coupled to at least one of the one or more storage devices for execution by at least one of the one or more processors via at least one of the one or more memories, configured to receive at least one sensor reading from at least one sensor on a user's device;

a determining module operatively coupled to at least one of the one or more storage devices for execution by at least one of the one or more processors via at least one of the one or more memories, configured to determine at least one setting on the user's device based upon the received at least one sensor reading;

a detecting module operatively coupled to at least one of the one or more storage devices for execution by at least one of the one or more processors via at least one of the one or more memories, configured to detect a change from the at least one sensor that could affect an optimal setting for the determined at least one setting; and a notifying module operatively coupled to at least one of the one or more storage devices for execution by at least one of the one or more processors via at least one of the one or more memories, configured to notify a user that the detected change has occurred.

9. The system according to claim 8, wherein the detected change is a change in a dynamic environment element.

10. The system according to claim 8, wherein the detected change is a change in a spatial event.

11. The system according to claim 8, wherein the detected change is a change in timing.

12. The system according to claim 8, wherein the detected change is a change in custom settings.

13. The system according to claim 12, wherein the notification includes an audible warning.

14. The system according to claim 8, wherein the user's device is a camera.

15. A computer program product comprising:

one or more computer-readable, tangible storage medium;

program instructions, stored on at least one of the one or more storage medium, to receive at least one sensor reading from at least one sensor on a user's device;

program instructions, stored on at least one of the one or more storage medium, to determine at least one setting on the user's device based upon the received at least one sensor reading;

program instructions, stored on at least one of the one or more storage medium, to detect a change from the at least one sensor that could affect an optimal setting for the determined at least one setting; and program instructions, stored on at least one of the one or more storage medium, to notify a user that the detected change has occurred.

16. The computer program product according to claim 15, wherein the detected change is a change in a dynamic environment element.

17. The computer program product according to claim 16, wherein the user's device is a camera.

18. The computer program product according to claim 15, wherein the detected change is a change in a spatial event.

19. The computer program product according to claim 15, wherein the detected change is a change in timing.

20. The computer program product according to claim 15, wherein the detected change is a change in custom settings.

* * * * *